United States Patent [19]

Fukuda

[11] 3,860,941
[45] Jan. 14, 1975

[54] MIRROR SHOCK ABSORBING DEVICE FOR SINGLE LENS REFLEX CAMERA

[75] Inventor: Susumu Fukuda, Hyogo, Japan

[73] Assignee: Fuji Photo Film Co., Ltd., Kanagawa-ken, Japan

[22] Filed: Aug. 15, 1973

[21] Appl. No.: 388,711

[30] Foreign Application Priority Data
Aug. 15, 1972  Japan............................ 47-081956

[52] U.S. Cl. ................................................ 354/156
[51] Int. Cl. .......................................... G03b 19/12
[58] Field of Search ................ 95/42; 354/152, 156

[56] References Cited
UNITED STATES PATENTS
2,854,907  10/1958  Tieck................................. 95/42 X
3,165,042  1/1965  Higuchi................................. 95/42
3,568,585  3/1971  Ishizaka................................. 95/42

Primary Examiner—John M. Horan
Attorney, Agent, or Firm—Sughrue, Rothwell, Mion, Zinn & Macpeak

[57] ABSTRACT

In a single lens reflex camera, a lever with counterweight is provided laterally to one side of the mirror so as to move it rotatatively in linkage with, but in a direction reverse to the rotary movement of the mirror, with a view to absorbing the striking energy of the reaction caused by rotatory movement of the mirror.

3 Claims, 5 Drawing Figures

PATENTED JAN 14 1975  3,860,941

MIRROR SHOCK ABSORBING DEVICE FOR SINGLE LENS REFLEX CAMERA

BACKGROUND OF THE INVENTION

1. Field of the Invention

This invention relates to a device for absorbing the shock acting on mirror in single lens reflex cameras and, more particularly, to a device for avoiding the possibility of camera movement resulting from movement of the mirror in a single lens reflex camera at the time of shutter release, i.e., during actual taking of a picture.

2. Description of the Prior Art

A single-lens reflex camera has a mirror which is normally disposed at an inclination of 45° to the optical axis so as to lead the incident rays from the lens to a viewfinder of the camera and which is so constructed as to spring up, shortly before release of a shutter, to an upward position, parallel to the optical axis thereby permitting the incident rays through the lens to travel onto a frame of film placed perpendicular to the optical axis, and to return to its original position immediately after the release of shutter.

It has often been the case where, because of pivotal movement of the mirror at the time of the shutter release, the reactive force of the mirror movement is transmitted to the camera body and the camera itself sustains a shock, giving rise ultimately to a blurred picture of an object being photographed.

Whereas many devices had heretofore been contrived to absorb the shock at the time of collision of the mirror with a fixed stop in the camera following its springing-up motion or return motion back to the original position, scarce consideration had been paid to the kind of shock as may be exerted to the camera body itself by an abrupt stoppage of the mirror following its pivotal movement.

Camera movement resulting from the pivotal movement of the reflective mirror is envisaged conspicuously particularly in large-sized, single lens reflex cameras, and, in recent days when there are rising demands for the large-size single-lens reflex cameras, there is great need to have such defects eliminated.

SUMMARY OF THE INVENTION

It is therefore a particular object of the invention to provide means for preventing the blur of photographed images in taking a photograph with a single lens reflex camera by absorbing the shock caused by pivot of the reflective mirror in the camera.

Another object of the invention is to provide the above described means in a simple construction by providing a counterweight on the lever which rotates in linkage with, but in a reverse direction to, the movement of the mirror.

Figure 1:
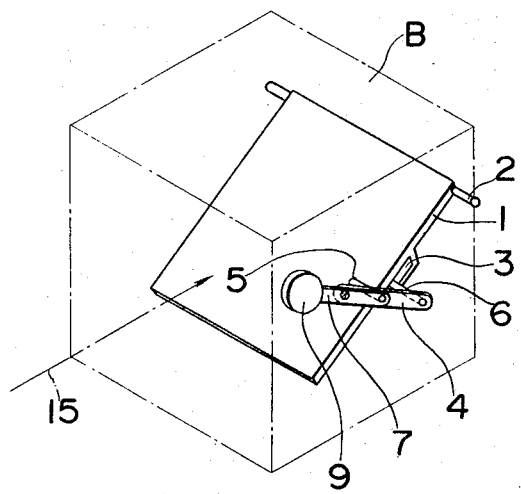
FIG. 1 is a perspective view of the shock absorbing device of the present invention in one form as applied to a reflex camera mirror.

Referring more particularly to the figures, the whole construction of the device is illustratively shown in a state of being assembled in a mirror box B which is indicated by chain lines, in which an objective lens (not shown) is supposed to be disposed on the center of the front lateral surface, a finder (not shown) on the upper surface, and a shutter (not shown) on the rear lateral surface, respectively. Normally a mirror frame 1 is positioned diagonally at an angle of 45° to the optical axis 15 of the objective lens to thereby lead the incident rays from the lens to the viewfinder after having been reflected by the mirror. When a shutter button (not shown) is depressed, the mirror frame 1 is sprung up clockwise, about the axis of a shaft 2 provided at the uppermost end of the mirror frame 1, to a position parallel to the optical axis 15 and, following the exposure of the film (not shown) to the incident rays, the mirror frame 1 pivots counterclockwise about the axis of the shaft 2 and returns to the original position as shown in FIG. 1.

The mirror is designed to move in linkage with the shutter by a conventional mechanism (not shown).

Provided adjacent to the lateral surface of the mirror box B is a lever 4 connected with a member 7 which has a thin cylindrical counterweight 9 at its extremity so as not to interrupt the mirror movement.

A pin 6 rigidly provided at one end portion of the lever 4 is loosely engaged in a groove 3 which is provided on one lateral side of the mirror frame 1 along the mirror surface. The lever 4 rotates about the axis of pin 5 by which said lever 4 is secured to a fixed portion of the camera body.

Figure 2:
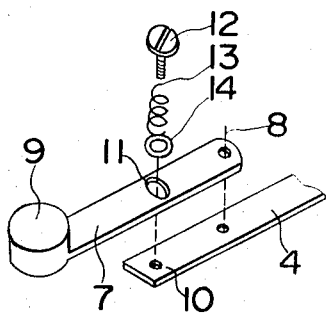
FIG. 2 is an enlarged exploded perspective view of the shock absorbing device of FIG. 1.

Referring then to FIG. 2, the lever 4 has a threaded hole 10 at its formost end and a hole 8' at a substantially intermediate portion thereof. The member 7 has the thin cylindrical counterweight 9 at its farthest end, and a curved slot 11, and a hole 8: The the lever 4 and member 7 are connected by a set screw 12 which extends through the slot 11 and is tapped into the threaded hole 10. A compression spring 13 is mounted around the set screw 12 for providing friction between the lever 4 and the member 7. If necessary, a washer 14 may be provided between the spring 13 and the member 7.

Figure 3:
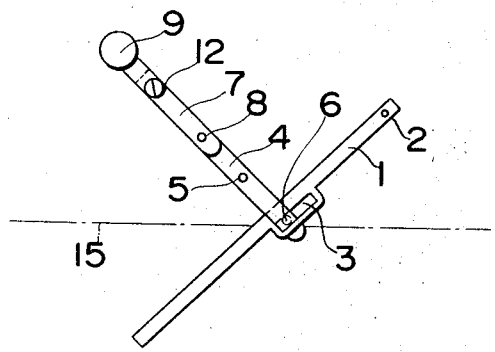
FIG. 3a is a side elevational view of the device of FIG. 1 with the mirror in inclined position.
FIG. 3b is a similar side elevational view to that of FIG. 3 with the mirror rotated to a position parallel to the optical axis.

Referring to FIGS. 3(a) and 3(b), as the mirror frame 1 upwardly pivots clockwise about the shaft 2, the pin 6 moves in the groove 3 whereby the lever 4 rotates counterclockwise about the axis of pin 5. Reversely, as the mirror frame 1 downwardly pivots counterclockwise, the pin 6 moves in the groove 3 whereby the lever 4 rotates clockwise about the axis of pin 5. The member 7, which has a thin cylindrical counterweight 9 at its extremity, pivots about the screw 8 relative to the lever 4. The counterweight 9 is to complement the shortage of weight of the lever which rotates always to a direction reverse to the direction of pivot of the mirror to offset the moment of inertia caused by the rotatory motion of the mirror structure.

When the shutter button (not shown) is depressed, the mirror frame 1 pivots clockwise about the axis of shaft 2 from the position indicated in FIG. 3(a) to the position shown in FIG. 3(b), which is approximately 45° from said first mentioned position, by means of the conventional mechanism. During this pivotal motion, the lever 4 and the member 7 pivot counter-clockwise about the axis of pin 5 from the position shown in FIG. 3(a) to the position shown in FIG. 3(b). Accordingly, the moment of interia of the mirror at the time of its springing-up is offset by the moment of inertia caused by the reverse pivotal motion of the lever 4 and the member 7 which carries a counterweight 9, by which the camera body is freed from the reaction caused by the pivot of the mirror. Likewise, when the mirror frame 1 restores its original position from the position shown in FIG. 3(b), the lever 4 and the member 7 pivot clockwise about the axis of pin 5. Accordingly, the moment of inertia of the mirror at the time of the return of miror is also offset by the moment of inertia caused by the reverse pivotal motion of the lever 4 and the member 7 which has a counterweight 9 by which the camera body is freed from the reaction that may result from the pivotal movement of the mirror.

When the mirror frame 1 is stopped by a stop (not shown), both the lever 4 and the member 7 provided with a counterweight 9 is apt to rotate further about the axis 8 by the moment of inertia against the lever 4. Accordingly, unless the stop is so provided as to be capable of absorbing the energy sufficiently at the time of collision, the force of collision of the counterweight 9 is transmitted to the camera body, causing shock to the camera. According to the present embodiment, however, it is so designed that the member 7 is disposed to retain its lengthwise direction at all times in agreement with the lengthwise direction of the lever 4 by means of a spring force, so that, even if the member 7 which has a counterweight 9 may be inclined to pivot about the axis 8 aginst the lever 4, the member 7 which has a counterweight 9 moves with its kinetic energy absorbed by the spring 13, causing the shock to the camera body to dwindle, and ultimately stop.

In the present invention, a lever provided with a counterweight for always equalizing the moments to the direction reverse to the direction of the pivotal motion of the mirror rotates, whereby the reaction caused by the pivotal motion of the mirror is offset before affecting the camera body, hence no camera movement takes place.

Incidentally, in stopping the mirror by means of the conventional stop, the stoppage of the primary lever reduces the kinetic energy acting on the camera, because the energy held by the counterweight which is connected to the lever by a spring is absorbed and dwindles by the said spring.

Further, when the relative angle of link between the mirror and the lever at the time of the starting springing-up or mirror as shown in FIG. 3(a) and at the time of stopping springing-up as shown in FIG. 3(b) is set at 90° (of course with some allowance), at the time of start of pivoting the mirror, the force of the rotatory motion of the mirror is exerted to the lengthwise direction of the lever, whereby the moving speed of the mirror at the time of start is diminished, giving rise to a further reduction of the reactive force sustained by the camera body at the time of start of the mirror; while at the time of stoppage of the mirror, the mirror is being tracted by the lever to the direction reverse to the direction of its pivotal motion, whereby the moving speed of the mirror at the time of stoppage is diminished, giving rise ro a further reduction of the kinetic energy passing to the camera body at the time of stoppage of the mirror.

Figure 4:
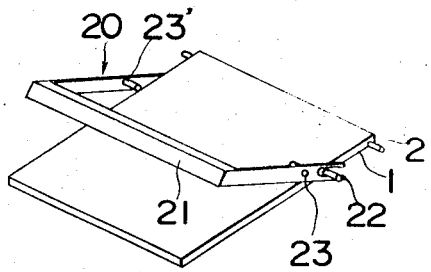
FIG. 4 is a perspective view of another embodiment of the present invention.
Figure 3:
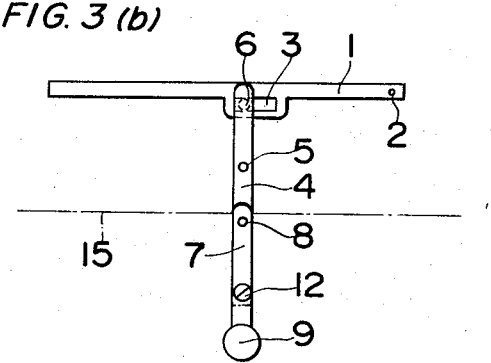

Referring further to FIG. 4, another embodiment is shown in which a stop capable of sufficiently absorbing the striking energy is provided on the lever 4 integrally with the counterweight 9, wherein a handle-like means 20 for rotary motion is provided, with its lateral beam member 21 utilized as a counterweight. Both ends of the rotary means 20 are notched in U-shape, being engaged with the pins provided on the mirror frame 1, only one of which is shown at 22. The holes 23 and 23' of the rotary means 20 accommodate the shaft (not shown) provided at a certain position of the camera body. The rotary means 20 moves rotatatively in such a manner that, at the time other than releasing of the shutter (not shown), the lateral beam member 21 is positioned adjacent the lower surface side of the mirror frame 1.

From the foregoing description of the present invention, it will be clear that the device of this invention affords a convenience to attain, by an extremely simple construction, the expected objects of preventing a camera shock that may result from the pivotal motion of a mirror in single-lens reflex cameras.

It is needless to mention that in case of a piston brake means, the counterweight in the present invention can be replaced by a piston.

What is claimed is:

1. In a single lens reflex camera having a case and a mirror pivotably attached within said case, an improved mirror shock absorbing device comprising:
   a. a lever pivotably attached to said case within said case at its approximate mid-point,
   b. a pin attached to a first end of said lever, said pin engaging said mirror,
   c. a member having a first end attached to a second end of said lever, and
   d. a counterweight rigidly affixed to a second end of said member.

2. The improved mirror shock absorbing device of claim 1 wherein:
   a. said first end of said member is pivotably attached to said second end of said lever, and
   b. spring means are interposed between said lever and said member to normally align said member with the longitudinal axis of said lever.

3. In a single lens reflex camera having a case and a mirror pivotably attached within said case, an improved mirror shock absorbing device comprising:
   a. a pair of parallel levers each having first and second ends, each pivotably attached to said case on laterally opposed sides of said case, and each of said levers having a notch on the first end,
   b. a pair of pins attached to said mirror engaging said notches in said levers, and
   c. a counterweight attached to said levers between the second ends of said levers.

* * * * *